Sept. 30, 1952      G. STEVEN ET AL      2,612,145
APPARATUS FOR AUTOMATICALLY SWITCHING FROM
GAS FUEL TO OIL FUEL IN DUAL FUEL
INTERNAL-COMBUSTION ENGINES
Filed Nov. 7, 1951
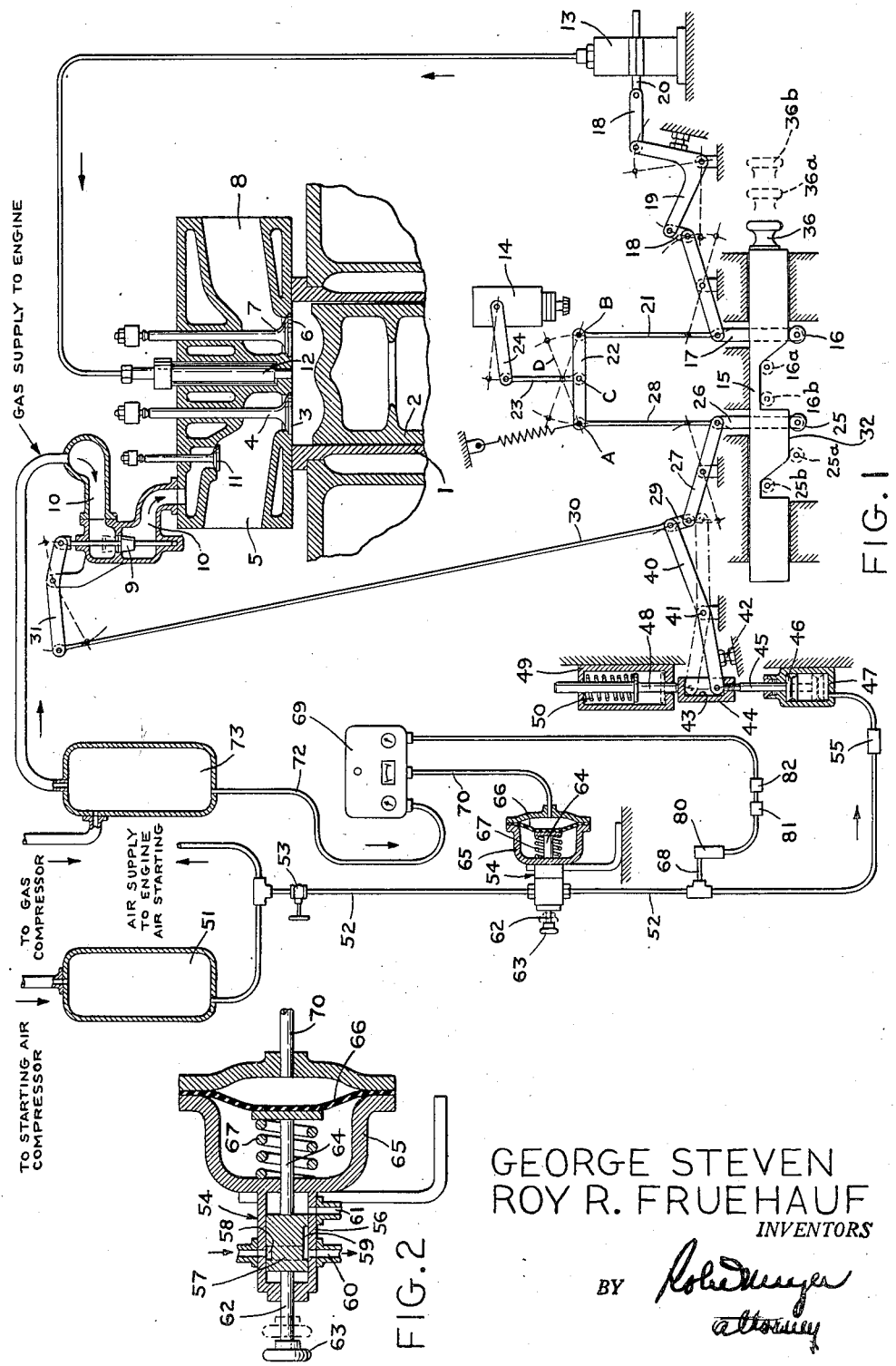
GEORGE STEVEN
ROY R. FRUEHAUF
INVENTORS Patented Sept. 30, 1952

2,612,145

UNITED STATES PATENT OFFICE 2,612,145

APPARATUS FOR AUTOMATICALLY SWITCHING FROM GAS FUEL TO OIL FUEL IN DUAL FUEL INTERNAL-COMBUSTION ENGINES

George Steven, Kenmore, and Roy R. Fruehauf, Orchard Park, N. Y., assignors to Worthington Corporation, a corporation of Delaware Application November 7, 1951, Serial No. 255,198

10 Claims. (Cl. 123—27)

1

This invention relates to internal combustion engines operating on a mixture of fuel gas and air, fuel oil and air or a combination of both, either supercharged or naturally aspirated, compression ignition or spark ignition, and more particularly to the control of the supply of fuel, either gas or fuel oil to the engine.

More particularly the invention relates to an apparatus for rapidly changing from gas fuel with pilot oil operation to operation of the engine on 100% oil fuel in response to a gas fuel failure.

Previous arrangements for such fuel changeover have involved the necessity of splitting the governor control linkage travel into two equal parts, utilizing one-half for gas fuel operation and the other half for operation on oil fuel after the gas failure.

Such arrangements involved a characteristic of governor operation with respect to speed droop which is undesirable. With a governor speed droop setting for normal operation of any fixed percentage, upon a failure of gas fuel when operation on the other half of the governor travel developed, the speed droop percentage would be approximately doubled. Such a condition upsets the distribution of load between engines which are operating in parallel with each other and may result in overloads or electrical discrepancies which will create an engine shutdown.

Failure of gas fuel manifests itself by a rapid reduction in the pressure of gas supplied or in the pressure of the incoming gas to the engine and the present invention embodies means utilizing such minimum gas pressure for actuating a device to rapidly change the engine over to 100% operation by fuel oil and at the same time permit utilization of the fuel governor travel for either gas fuel or oil fuel under any circumstances and eliminates the undesirable characteristic of speed droop change and cyclic disturbance which can also effect the load condition on the electrical apparatus, which due to automatic devices incorporated for protective reasons may shut down the engine.

With these and other objects in view, as may appear from the accompanying specification, the invention consists of various features of construction and combination of parts, which will be first described in connection with the accompanying drawings, showing apparatus for automatically switching from gas fuel to oil fuel in a dual fuel internal combustion engine of a preferred form embodying the invention, and the features forming the invention will be specifically pointed out in the claims.

2

In the drawings:

Figure 1 is a diagrammatic view partly in section and partly in elevation of a fragment of an internal combustion engine equipped with the automatic fuel changeover mechanism of the present invention.

Figure 2 is a detail section through a valve structure employed in the automatic fuel changeover mechanism.

Figure 1 of the drawings shows a fragmentary section of a naturally aspirated dual fuel engine, capable of operation on a mixture of air and gas, air and fuel oil, or on a combination of gas, fuel oil and air. The engine includes the usual cylinder 1 in which a piston 2 reciprocates. The cylinder 1 has an air and gas fuel inlet port 3 controlled by an intake valve 4 and which port communicates with the air intake passage 5. The exhaust port 6 which is controlled by an exhaust valve 7 communicates with the exhaust passage 8. Gas fuel is delivered into the intake 5 through the gas metering valve 9 and passage 10 under control of the valve 11 while fuel oil, both for the pilot ignition charge and for power charge is delivered to the cylinder 1 through the fuel injection or spray valve 12.

Fuel and pilot injection fuel oil is delivered to the injection or spray valve 12 by the fuel pump 13.

The operation of the fuel pump 13 and the gas metering valve 9 are under control of the engine governor 14 through the manually set controlled cam 15. The cam 15 is slidably supported for longitudinal movement and has an operating knob 36 thereon, although a lever may be connected to the cam for operating it if desired. A cam roller 16 engages the cam 15 and is carried by the fuel pump lever link 17 which is connected by a series of links 18 and a bell crank 19 to the fuel pump operating shaft 20. The fuel pump lever or link 17 is connected by a rod or a governor fuel pump link 21 to the governor rocker lever 22. The governor rocker lever 22 is connected by the link 23 to the governor lever 24 which is connected to and operated by the governor 14.

A second cam roller 25 engages the cam bar 15 and is carried by the control valve cam link 26. The end of the link 26 remote from the roller 25 is pivotally connected to a pivoted control valve cam lever 27 and to a link 28. The link 28 is connected to the end of the governor rocker lever 22 remote from the connection of the link 21 to the rocker lever. Links 29 and 30 connect the control valve cam link 27 to the pivoted lever 31 which is connected to the stem of the gas metering valve 9 and operates or moves the gas metering valve in response to action of the governor 14.

When the cam 15 is moved into the position indicated by the dotted position 36a of the knob 36 the roller 16 assumes the position 16a and the roller 25 assumes the position 25a still on the maximum land 32 of the cam 15, at which time the mechanism is set for the engine to run on a fuel mixture of fuel oil and air, or as an oil or diesel engine and the gas metering valve 9 will be held closed. When the cam 15 is moved into the position indicated by the dotted line position 36b of the knob 36 the cam rollers 16 and 25 are moved into the dotted line positions 16b and 25b respectively, which places the gas metering valve 9 under control of the governor 14 as well as the fuel pump 13, and during such time as there is sufficient gas fuel to operate the engine to meet its load requirement, only a pilot ignition charge of oil is delivered to the injection or spray valve 12 and the engine operates as an oil ignited gas fuel engine, or as a gas diesel. However, when the supply of fuel gas is insufficient to meet the load demands of the engine then the governor acts to augment the gas fuel supply by proportionate increase in the supply of fuel oil. Internal combustion engines of this type and operating on the same principle, showing slightly different control arrangements are shown in United States Patents No. 2,400,219 and No. 2,400,247, issued May 14, 1946.

As hereinabove set forth, reduction in the supply of gas to the engine manifests itself by a rapid reduction in the pressure of the incoming gas and the present invention contemplates means operated by such a reduction in the pressure of the gas to completely cut off the supply of gas to the engine and convert it to 100% operation on fuel oil, thus avoiding the undesirable characteristic of speed droop change and cyclic disturbance above referred to which occurs with the changeover of the engine above described.

In the present invention the lever 40 is connected to the gas metering valve operating link or rod 30. The lever 40 is pivotally supported intermediate its ends as shown at 41 and an adjustable stop 42 is provided for limiting the movement of the lever in one direction. The free end of the lever 40 rides in a slot 43 in a locking latch 44. The locking latch 44 is carried by the piston rod 45 which is in turn connected to a piston 46 mounted for reciprocation in a cylinder 47. The end of the locking latch 44 opposite to the end connected to the piston rod 45 is engaged by the end of a spring pressed rod 48 which is enclosed in a suitable housing 49 and engaged by a spring 50.

The piston 46 is forced upwardly into the position shown in Figure 1 for moving the locking latch 44 against the tension of the spring 50 by pressure air which may be taken from any suitable source but which in Figure 1 of the drawings is shown as being taken from the air receiver 51 which supplies the starting air for starting the engine. The air from the air receiver 51 passes through a pipe 52 in which is mounted a manually operated valve 53 to and through the pressure valve operated structure 54 and through a suitable flow control valve 55 into the bottom of the cylinder 47.

The pressure actuated valve structure 54 includes a valve casing 56, Fig. 2, in which is reciprocably mounted a valve piston 57 having an annular cutout 58 to provide communication between the pipe 52 on opposite sides of the valve 54 and it is provided with an elongated cutout 59 to establish pressure bleed-off connection between the outlet port 60 which leads to the cylinder 47 and the bleed-off port 61 so that when the valve piston 57 is in its inward position the pressure air will be bled from the cylinder 47. The stem 62 of the valve piston 57 has a knob 63 thereon to facilitate initial manual setting of the valve piston 57.

The valve piston 57 has a second stem 64 connected thereto which extends into the sealed housing 65 and is connected to a diaphragm 66. The diaphragm 66 is spring loaded by spring 67 so as to urge the valve piston 57 into position for bleeding air from the cylinder 47.

A branch pipe 68 communicates with the pipe 52 and leads to an automatic controller 69. The automatic controller 69 is a mechanism which measures the value of a variable quantity or condition and operates to correct it to a selected value and such controllers are well known and may be purchased upon the open market. Such controllers are manufactured by The Bristol Company, Moore Products Co. and others. The pressure air from the pipe 52 enters the automatic controller 69 through the pipe 68 and leaves the controller through a pipe 70 which is connected to the interior of the sealed casing 65 at the side of the diaphragm 66 opposite to the spring 67 so that the pressure of air acting on the diaphragm 66 will tend to force the valve piston 57 outwardly to open the pipe 52 through the three-way valve structure 54 to permit delivery of air to the cylinder 47.

In the application of the controller 69 in the present invention it utilizes variances in the pressure of the incoming gas to the engine to control the delivery of air into the sealed casing 65 of the pressure actuated three-way valve structure 54. A pipe 72 connects the automatic controller 69 to the gas supply receiver 73 which receives the gas from the gas compressor (not shown) and delivers it to the gas intake passage 10 on the upstream side of the gas metering valve 9.

Variances in the pressure of the incoming gas to the engine are transmitted to the automatic controller 69 and acts as a control pressure which regulates the delivery of the air from the pipe 52 against the diaphragm 66 for operating the piston 57 of the three-way valve 54 and thus the delivery of air under pressure to the cylinder 47 is controlled in accordance with predetermined variances in the pressure of the incoming gas. However, the controller 69 is set so that when the pressure of the incoming gas falls below a predetermined degree the supply of air to the sealed housing 65 and adjacent the diaphragm 66 will be cut off allowing the spring 67 to expand, move the diaphragm and move the valve piston 57 inwardly to connect the interior of the cylinder 47 with the bleed-off port 61, at which time the pressure air will be bled from the cylinder 47 and the spring 50 will act to move the locking latch 44 downwardly and to move the lever 40 into the position shown in solid lines in Figure 1 of the drawings. This movement of the lever 40 will, through the medium of the link 30 and lever 31, move the gas metering valve into complete closed position. The movement of the locking latch 44 downward under action of the spring 50 will lock the lever 40 in its lowermost position as shown in solid lines in Figure 1 of the drawings and prevent the lever 40 from any further upward movement from the stop position. The movement of the lever 40 into its lowermost valve closing position locates the fulcrum point A of the lever 22 immediately to its lowermost position permitting the governor lever 24 acting on the lever 22 and pivot C thereof to position the point B of the lever 21 to its upward position shown by the dot and dash lines D to maintain the load carrying capacity operation of the engine with 100% operation on fuel oil. It can be clearly seen, therefore, that the governor lever 24 will always operate through its maximum permissible travel regardless of what type of fuel the engine is being supplied with. By venting the pressure air from the automatic controller 69 and the cylinder 47 to atmosphere it is impossible for the engine to revert to gas operation if the gas supply for any reason reaches a suitable pressure for operation of the engine by gas fuel so long as the valve piston 57 remains in its pressure air bleeding position.

However, when or at such time as the gas pressure and gas supply is sufficient to operate the engine under gas fuel the valve piston 57 is manually moved outwardly or the three-way valve 54 is manually set through the medium of the knob 63 and stem 62 and this opens the pressure air supply through the three-way valve 54 to both the cylinder 47 and the automatic controller 69. The gas pressure to the automatic controller 69 being sufficient to operate it to permit the passage of pressure air therethrough, such pressure air is delivered against the diaphragm 66 and holds the valve piston 57 in its open position. The air under pressure entering the cylinder 47 will move the locking latch upwardly against the tension of the spring 50 and release the lever 40 from its locked position, thus permitting the lever 40 to move freely from the position shown by solid lines into the dot and dash line position shown in Figure 1 of the drawings. This travel of the lever 40 is the full amount of travel necessary to control the gas metering valve 9 from minimum to maximum positions and to allow control of the supply of fuel gas to the engine in accordance with load demands under control of the governor 14.

It may be necessary to reduce the pressure of the air in the pipe or line 52 as it is delivered to the automatic controller 69 as well as to strain it, and therefore a filter or trap 80 and reducing valves 81 and 82 are interposed in the pipe 68. These elements 80, 81 and 82 are well known and may be purchased upon the open market. When the valve piston 57 is in position for bleeding the pressure air from the cylinder 47 it also bleeds the pressure air from the automatic controller 69 since the pipe 68 is connected to the pipe 52 on the downstream side of the pressure actuated three-way valve 54.

It will be understood that the invention is not to be limited to the specific construction or arrangement of parts shown, but that they may be widely modified within the invention defined by the claims.

What is claimed is:

1. The combination with a dual fuel internal combustion engine operable on a mixture of fuel gas and air, fuel oil and air, or a combination of both including a combustion chamber, a gas inlet passage, a gas metering valve controlling flow of gas to said combustion chamber, a fuel oil inlet spray valve, a governor, and governor operated means for operating said gas metering valve and for controlling delivery of fuel oil to said spray valve, of governor operated means for moving said gas metering valve, means for locking said governor operated means to hold said gas metering valve in closed position, and means controlled by pressure of entering fuel gas for controlling operation of said locking means.

2. The combination with a dual fuel internal combustion engine operable on a mixture of fuel gas and air, fuel oil and air, or a combination of both including a combustion chamber, a gas inlet passage, a gas metering valve controlling flow of gas to said combustion chamber, a fuel oil inlet spray valve, a governor, and governor operated means for operating said gas metering valve and for controlling delivery of fuel oil to said spray valve, of governor operated means for moving said gas metering valve, means for locking said governor operated means to hold said gas metering valve in closed position, pressure operated means for releasing said locking means, and means controlled by pressure of entering fuel gas for controlling operation of said pressure operated means.

3. The combination with a dual fuel internal combustion engine operable on a mixture of fuel gas and air, fuel oil and air, or a combination of both including a combustion chamber, a gas inlet passage, a gas metering valve controlling flow of gas to said combustion chamber, a fuel oil inlet spray valve, a governor, and governor operated means for operating said gas metering valve and for controlling delivery of fuel oil to said spray valve, of governor operated means for moving said gas metering valve, means for locking said governor operated means to hold said gas metering valve in closed position, pressure operated means for releasing said locking means, a valve for controlling the delivery of pressure fluid to said pressure operated means, and means controlled by pressure of entering fuel gas for controlling operation of said valve.

4. The combination with a dual fuel internal combustion engine operable on a mixture of fuel gas and air, fuel oil and air, or a combination of both including a combustion chamber, a gas inlet passage, a gas metering valve controlling flow of gas to said combustion chamber, a fuel oil inlet spray valve, a governor, and governor operated means for operating said gas metering valve and for controlling delivery of fuel oil to said spray valve, of governor operated means for moving said gas metering valve, means for locking said governor operated means to hold said gas metering valve in closed position, pressure operated means for releasing said locking means, a manually initially set pressure operated valve for controlling delivery of pressure fluid to said pressure operated means, and means operated by pressure of entering fuel gas for controlling the operation of said pressure operated valve.

5. A dual fuel internal combustion engine as claimed in claim 1 wherein said locking means includes a locking latch, pressure operated means for moving said latch into unlocking position, and means for moving said latch into locking position upon release of pressure from said pressure operated latch moving means.

6. A dual fuel internal combustion engine as claimed in claim 1 wherein said locking means includes a locking latch, pressure operated means for moving said latch into unlocking position, and means for moving said latch into locking position upon release of pressure from said pressure operated latch moving means, and wherein said gas pressure controlled means includes means operated by pressure of incoming gas for controlling the delivery of pressure fluid to and the bleeding of pressure fluid from said pressure operated latch moving means.

7. The combination with a dual fuel internal combustion engine operable on a mixture of fuel gas and air, fuel oil and air, or a combination of both, including a combustion chamber, a gas inlet passage, a gas metering valve controlling flow of gas to said combustion chamber, a fuel oil inlet spray valve, a governor, and governor operated means for operating said gas metering valve and for controlling delivery of fuel oil to said spray valve, of governor operated means for moving said gas metering valve, a lever connected to said governor operating means, means for locking said lever in gas metering valve closing position, and means controlled by pressure of incoming fuel gas for moving said locking means to permit opening of said gas metering valve.

8. The combination with a dual fuel internal combustion engine operable on a mixture of fuel gas and air, fuel oil and air, or a combination of both, including a combustion chamber, a gas inlet passage, a gas metering valve controlling flow of gas to said combustion chamber, a fuel oil inlet spray valve, a governor, and governor operated means for operating said gas metering valve and for controlling delivery of fuel oil to said spray valve, of governor operated means for moving said gas metering valve, a lever connected to said governor operated means, means for locking said lever in gas metering valve closing position, pressure actuated means for moving said locking means into position to permit opening of said gas metering valve, a valve controlling delivery of pressure fluid to said pressure operated means, and means operated by pressure of incoming fuel gas for controlling operation of said valve.

9. The combination with a dual fuel internal combustion engine operable on a mixture of fuel gas and air, fuel oil and air, or a combination of both including a combustion chamber, a gas inlet passage, a gas metering valve controlling flow of gas to said combustion chamber, a fuel oil inlet spray valve, a governor, and governor operated means for operating said gas metering valve and for controlling delivery of fuel oil to said spray valve, of governor operated means for moving said gas metering valve, a lever connected to said governor operated means, means for locking said lever in gas metering valve closing position, pressure actuated means for moving said locking means into position to permit opening of said gas metering valve, a valve controlling delivery of pressure fluid to said pressure operated means, and means operated by pressure of incoming fuel gas for controlling operation of said valve, said valve operable when pressure of incoming gas falls below a predetermined degree to bleed pressure fluid from said pressure actuated means, and a spring for moving said locking means and said lever into gas metering valve closing position when pressure fluid is bled from said pressure actuated means.

10. The combination with a dual fuel internal combustion engine operable on a mixture of fuel gas and air, fuel oil and air, or a combination of both including a combustion chamber, a gas inlet passage, a gas metering valve controlling flow of gas to said combustion chamber, a fuel oil inlet spray valve, a governor, and governor operated means for operating said gas metering valve and for controlling delivery of fuel oil to said spray valve, of governor operated means for moving said gas metering valve, a lever connected to said governor operated means, means for locking said lever in gas metering valve closing position, pressure actuated means for moving said locking means into position to permit opening of said gas metering valve, a valve controlling delivery of pressure fluid to said pressure operated means, and means operated by pressure of incoming fuel gas for controlling operation of said valve, said valve operable when pressure of incoming gas falls below a predetermined degree to bleed pressure fluid from said pressure actuated means, and a spring for moving said locking means and said lever into gas metering valve closing position when pressure fluid is bled from said pressure actuated means, and manually operated means for operating said valve to permit the delivery of pressure air to said pressure operated means.

GEORGE STEVEN.
ROY R. FRUEHAUF.

No references cited.